INVENTOR.
NYLES V. REINFELD
BY
Oldham & Oldham
ATTORNEYS.

United States Patent Office 3,667,884
Patented June 6, 1972

3,667,884
CONTROL APPARATUS FOR INJECTION MOLDING PRESS
Nyles V. Reinfeld, 610 Treeside Drive,
Akron, Ohio 44313
Continuation-in-part of application Ser. No. 791,372,
Jan. 15, 1969. This application Nov. 25, 1969, Ser.
No. 879,853
Int. Cl. B29c 3/06
U.S. Cl. 425—149
2 Claims

ABSTRACT OF THE DISCLOSURE

The new control for an injection molding press includes an electric signal or voltage supply means that is operatively secured to one of two relatively movable press platens, and has a member associated therewith for changing the signal produced. A contact means is operatively secured to the other of the relatively movable platens and positioned to contact the signal means when the mold sections are adjacent or in contact and vary the signal dependent upon the relative positions or movement of the mold sections on the platens. A controllable variable second signal or voltage generating or supply means is provided and electric circuit means are present to measure and compare the signals and provide an output signal under predetermined conditions, which output signal is used for terminating actuation of the injection means in the press when the mold sections are starting to be separated.

---

The present invention is a continuation-in-part of my prior application Ser. No. 791,372, filed Jan. 15, 1969, now abandoned.

The present invention relates to injection molding presses, and especially to presses for injecting rubbers, plastic materials, and other elastomeric materials into mold cavities, and especially to improved controls for such presses to terminate mold filling action rapidly when the mold cavity or cavities are full.

Heretofore there have been various types of devices provided for endeavoring to control mold filling actions in injection presses and wherein such control means endeavor to measure, accurately, the time or point in the injection cycle when the mold cavity is full of injected material and when additional injection of material tends to separate the mold sections and open the mold cavity. Insofar as I am aware, all of the presently known means for controlling such injection cycles are somewhat objectionable in that they do not have the extreme accuracy of control as is desired, while some control means do not function rapidly enough for completely satisfactory control action, or such controls may be objectionable for other reasons.

The general object of the present invention is to provide a novel and improved control means for rubber injection presses and wherein such control means includes a variable signal generator means operatively associated with the two relatively movable mold sections and which means is adapted to produce an instantaneous signal, differing from the normal signal under mold closed conditions, when the molds are started to be separated during mold filling action.

Another object of the invention is to use electrical circuit control means for providing a rapid, positively controlled termination of a mold injection cycle when a mold cavity is full of injected material and when any separating movement of the abutted molds has started to occur.

Another object of the invention is to provide a variable electric signal, or signals that can be accurately preset and controlled in an injection press and then to provide a second controllable balancing signal, or signals in the apparatus and to provide measuring control or circuit means receiving the two signals or resultants thereof and which control circuit is adapted to provide an output signal when the two, or two sets of measured signals are out of balance with each other in a predetermined manner.

Another object of the invention is to provide an electrical control means in an injection molding press whereby rapid, positive, extremely accurate measurements can be electrically obtained to indicate when a pair of movable mold sections are starting to be pushed apart by an injection molding action and to use the created electric signal for termination of injection molding action; and to provide improved molded articles with a minimum of mold flash thereon.

The foregoing and other objects and advantages of the invention will be made more apparent as the specification proceeds.

Attention now is particularly directed to the accompanying drawings, wherein.

When referring to corresponding members shown in the drawings and referred to in the specification, corresponding numerals are used to facilitate comparison therebetween.

Figure 1:
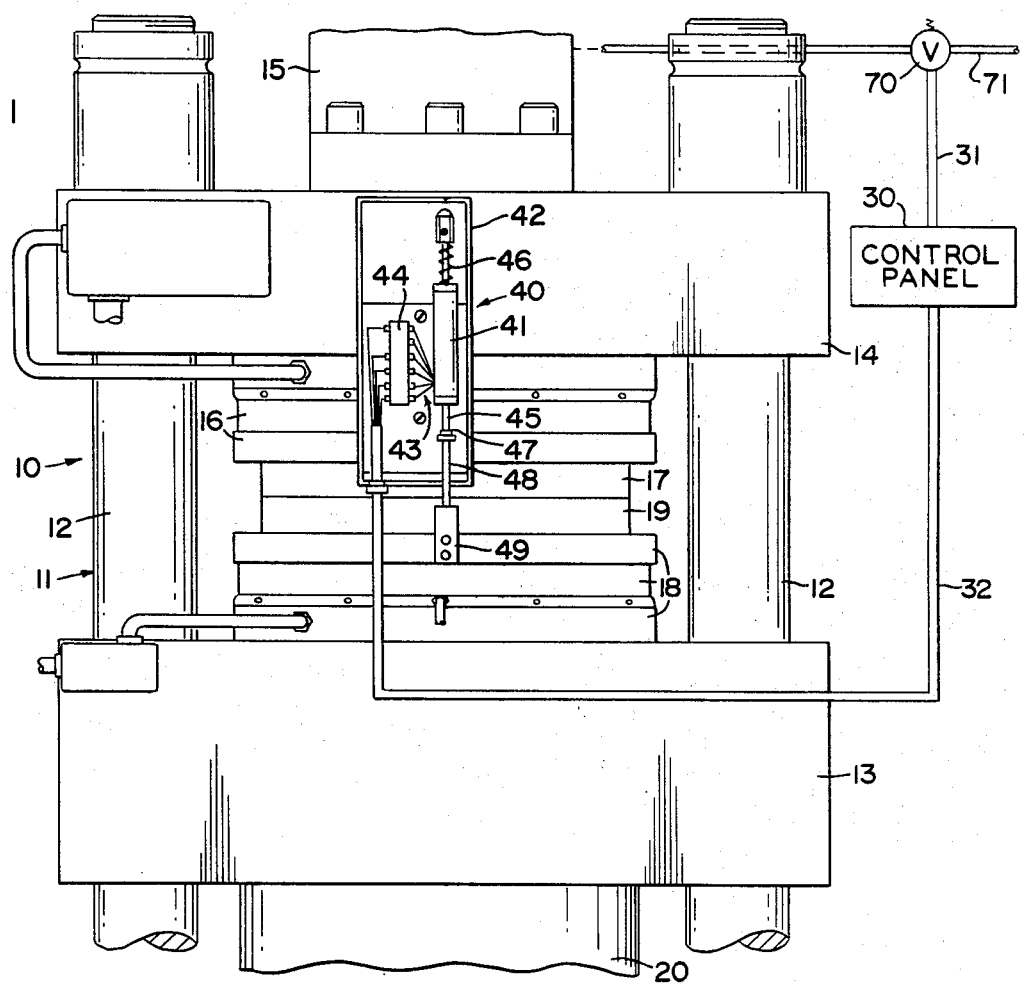
FIG. 1 is a fragmentary elevation of a portion of an injection molding press and a part of the control means of the invention.

Reference now is made to the details of the apparatus and controls shown in the drawings, and a typical rubber injection molding press 10 is shown in FIG. 1. This press 10 has conventional means therein, such as a frame 11 that includes a plurality of longitudinally extending rods or bars 12 on which a platen 13 is slidably secured or carried. The frame 11 also includes a fixed platen or top plate 14 therein, usually at the upper end of the frame 11. Any suitable or conventional injection molding means 15, usually having heater means associated therewith, are provided that are suitably secured to the frame, usually to the top surface of the fixed platen 14. Such injection molding means include a cylinder and a power driven piston (not shown) and wherein the material to be injected is received within such means 15 and is forced therefrom through suitable nozzle means (not shown) secured thereto. In this particular apparatus, one or more mold support plates 16 are secured to the fixed platen 14 and one mold section 17 is shown suitably attached to the lowermost one of the mold supports 16. Likewise, any suitable mold support plates 18 can be suitably attached to the movable platen 13 on the upper surface thereof, and a second mold section 19 is secured to the upper surface of such plate 18. Any conventional means, usually a multi-piston and cylinder assembly, indicated by a cylinder 20, can be operatively attached to the movable platen 13 on the lower surface thereof for reciprocating the movable platen 13 on the lower surface thereof for reciprocating the movable platen 13 and members secured thereto by a piston positioned in the cylinder whereby the mold sections 17 and 19 can be abutted and brought into pressure engagement with each other to form a mold cavity for receiving the material forced into the mold cavity (not shown) provided between the abutted mold sections 17 and 19. Obviously, the injection molding means 15 operatively connects by its injection nozzle to the upper mold section 17 to direct material into the mold cavity in the usual manner under pressure when the injection molding means 15 are actuated.

FIG. 1 of the drawings also shows that a suitable control panel 30 is provided in association with the press 10 and it has leads 31 extending therefrom to be operatively attached to conventional controls for regulating or actuating the injection molding means 15 to cause the material therein to be forced therefrom into the desired mold cavity. Other leads, or a cable 32, are shown extending from the control panel 30 which has power supplied thereby by means (not shown), and such leads communicate with a suitable signal or voltage producing or generating means 40 which is operatively associated with the press 10. This signal generating means 40 is shown in this embodiment of the invention to comprise a signal generator, or transducer 41 that is suitably secured to the fixed platen 14 of the press, as by a mounting plate or bracket 42. The signal generator has a plurality of leads 43 extending therefrom which normally may connect to a terminal block 44, for example, and where such terminal block 44 in turn has the leads 32 from the control panel connecting thereto. The signal generator 41 normally has a movable member associated therewith or some other equivalent means is provided for placing pressure upon, or making a change in the signal generator 41 for changing the operating conditions thereof. Thus, in this instance, an armature rod or unit 45 is shown extending from both ends of the signal generator 41 and a spring 46 is in operative engagement with the armature rod 45 at the upper end thereof so as to exert a downward force upon the armature rod 45 at all times. A head 47 may be provided on the lower end of the armature rod 45 and a suitable member, such as a pressure plunger or rod 48 is provided on a bracket 49 that is attached to one of the mold support plates 18 operatively carried by the movable platen 13. Thus, on mold closing action, the armature rod 45 and the pressure rod 48 are of such size and so positioned that the pressure rod 48 engages the armature rod 45 and forces it upwardly at least a short distance. The armature rod has a suitable armature means (not shown) provided thereon positioned in a coil (not shown) provided in the signal generator 41 whereby axial movement of such armature rod will produce a variation in the signal generated in the signal generating means 40 and transmitted therefrom through the leads 32 to the control panel. Then when the molds are fully engaged, the signal or signals from the means 40 can be balanced in the control panel 30 whereby any variation in the signal can be rapidly measured as soon as any mold separating action occurs, and such signal change can be used for control function. Of course, the spring 46 will engage the head 47 to be compressed by any movement thereof upwardly. A switch may be provided to turn power onto the signal generator means 40 when the mold is closed and one type of such means is disclosed hereinafter.

In one embodiment of the invention, the signal generator 41 is of the transducer type and may, for example, be Model No. 6206 (LVDT), a linear variable differential transducer which is made by Automatic Timing and Controls, Inc. of King of Prussia, Pa. Such signal generating means in turn connects to the control panel 30 which preferably comprises an LVDT Relay Operator No. 6182 made by the same company. In general, a variable electrical voltage or signal is adapted to be produced by the signal generating means 40 and this signal will be constant for a fixed position of the molds but will be varied when any relative movement is occasioned between the mold sections carried by the movable platen 13 and fixed platen 14 and hence reflected by relative movement of the rods 45 and 48. This changes the transducer operating conditions and the signal or signals therefrom. Normally, relatively high hydraulic pressure in the cylinder 20 is provided to hold the mold sections into operative pressure engagement for molding action of a desired article in the mold cavity. Hence, when the resilient flowable elastomeric material is forced into the mold cavity under high injection pressure, it will rapidly fill the mold cavity or cavities and then start to push the mold sections apart slightly. Any slight movement of the mold sections relative to each other, such as about .001 to about .003 inch or more, changes the operative conditions established within the signal generating means when the molds are operatively engaged and such modified signal is transmitted to the external control by the leads 32.

Figure 2:
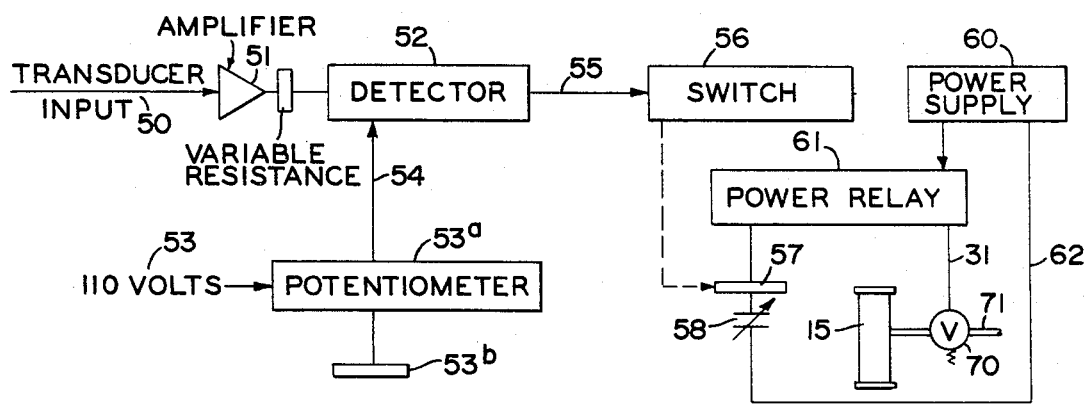
FIG. 2 is a diagrammatic wiring diagram of the control means or control circuit used in the apparatus of the invention.

With reference to the details of FIG. 2, the signal from the generator 41 is indicated as a transducer input, and identified by the numeral 50, and is carried by one of the leads 32. This signal, being relatively weak, is preferably amplified by a suitable amplifier 51, which in turn feeds the amplified signal to a suitable measuring means such as a detector 52. The signal passed into the detector 52 is then compared to a predetermined standard signal generated from a 110 volt source signal 53 which feeds through a potentiometer 53a and over the line 54 into the detector 52. The potentiometer is preferably one very finely wound, and extremely sensitive so that it might be adjusted by a mechanical micrometer control knob 53b provided on the control panel.

While the invention contemplates that any suitable type of detector 52 would meet the objects of the invention, in essence what is to be accomplished by the detector is a comparison of the amplified transducer signal 50, actually the transducer output, to the predetermined signal controlled by the potentiometer 53a. For example, the detector 52 might comprise a balanced bridge circuit such as a Wheatstone bridge. As is well known, bridges are suited for measurement purposes, since an unknown can be measured in terms of a standard to a high degree of accuracy, independent of the voltage calibration or impedence of the source of detector. It is well known that resolutions of one part in $10^8$ or better can be obtained utilizing bridge circuits. In any event, the potentiometer 53a will be set so as to obtain a normal balance and, for example, no output over a line 55 from the detector 52 when there is no actuation of the plunger 45 of the signal generating means 40 in relation to the fully mold closed position thereof. When a predetermined minimum movement has occurred between members 48 and 45 causing a change in the transducer input signal 50 of a sufficient amount so as to indicate, for example, a range of between .001 to .003 inch, the detector will produce a signal, by becoming unbalanced if a balanced bridge circuit is utilized, with this signal sent over line 55 to a solenoid or similar type switch 56. The switch 56 mechanically actuates a plunger 57 or equivalent member which in turn mechanically actuates a normally closed switch 58.

The switch 58 provides control of a power supply 60 which operates through a power relay 61, and in turn controls as actuation signal over leads 31 to a suitable control means such as a solenoid actuated valve 70 that connects to a pressure line 71 to control flow of pressure liquid to the injection means 15. The valve 70 and associated structure are also indicated in FIG. 1 of the drawings.

Hence, it should be understood that the power relay 61 controls power flow to control the actuation of valve 70 or other means to terminate injection molding action, and that the relay 61 only operates when the switch 58 is closed to allow power supply 60 to energize the relay 61 and open or hold the valve 70 open for flow of pressure liquid therethrough.

Since, in some instances it may be desirable to provide some selective control of the transducer input signal 50 from the signal generator 41, a suitable adjustable potentiometer or variable resistor 50a might be positioned between the amplifier 51 and detector 52, as shown in FIG. 2 of the drawings.

Hence, by providing a very sensitive detector 52 and by using a sensitive potentiometer 53a, a small variation of the transducer input signal 50 from the transducer can be used to cause an immediate, effective termination of the actuation of the injection molding means 15 as soon as the mold sections have started to be opened. Since this action is almost instantaneous, the amount of mold flash is materially reduced in the molded article. Also, the flash produced in different cycles is at least substantially uniform. Other conventional controls will be incorporated in the control panel 30 to initiate normal mold closing and opening, as is conventional in the art. However, it is to be understood that the instant invention relates to the particular circuitry adapted to indicate precisely within a very few thousandths of inches when mold opening begins to occur after the injection pressure has been applied to a pair of closed mold sections.

Figure 3:
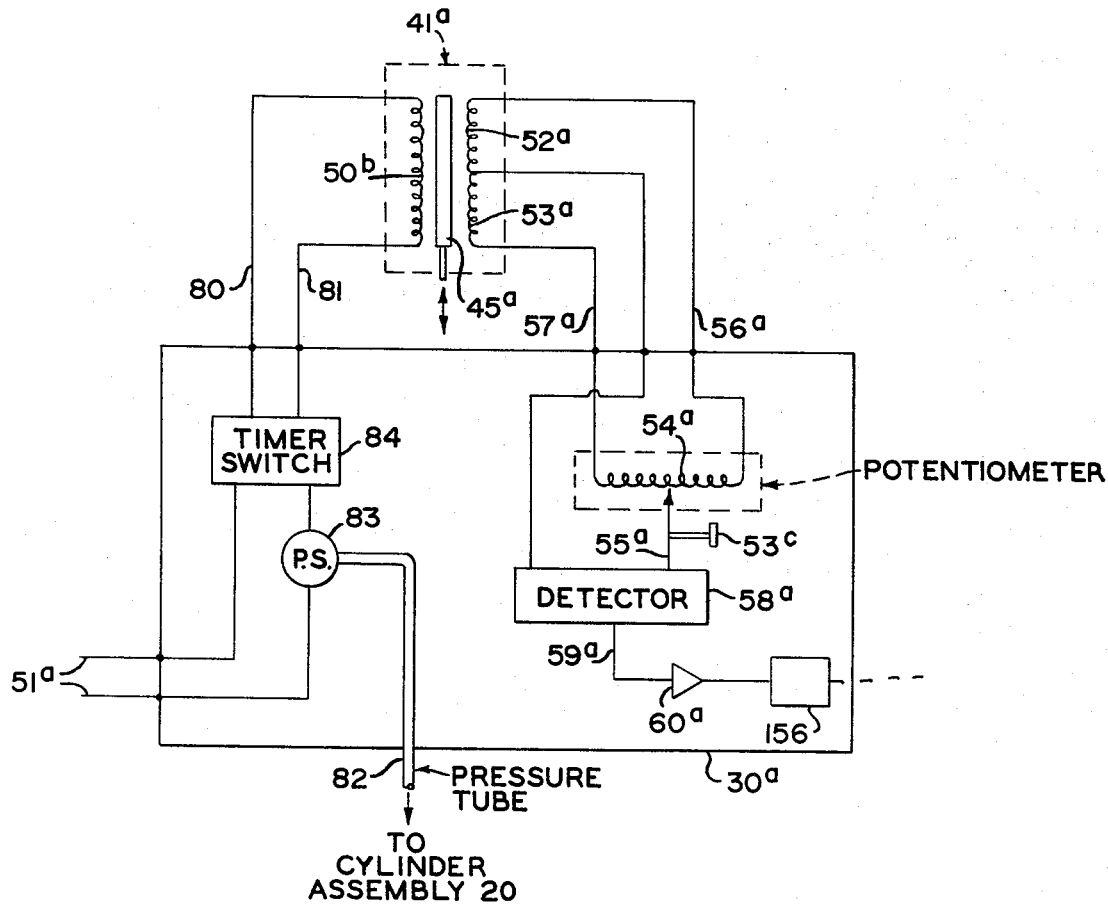
FIG. 3 is a diagrammatic view of a modification of a portion of the circuit of FIG. 2.

A modification showing another typical control circuit of the invention is illustrated in FIG. 3. With reference to the details of the circuit of FIG. 3, a signal generator or transducer 41a includes one coil 50b that is energized from a suitable A.C. voltage source 51a by leads 80 and 81 and a pair of opposed coils 52a and 53a. The coils 52a and 53a, in effect, form the secondary of a transformer of which the coil 50b is the primary coil. A movable armature 45 is indicated between the coil 50b and coils 52a and 53a and such signal generator is of the type whereby the signals induced in the coils 52a and 53a are modified by slight axial movement of the armature 45. A Wheatstone bridge is formed from the coils 52a and 53a in association with a potentiometer 54a that has an adjustable lead 55a connecting thereto, as indicated. Such lead 55a is adapted to be controlled mechanically so that, for example, a micrometer control knob 53c, shown diagrammatically, may be provided in association therewith for fine adjustments of such potentiometer whereby a balanced Wheatstone bridge condition can be set up between the output leads 56 and 57a connecting between the mid points of the bridge. Such output signal or signals are fed to a conventional detector 58a. Naturally the operating conditions are so established in the control circuit of the invention that, for example, a zero output signal is obtained from the Wheatstone bridge when proper operative mold filling conditions are established in the apparatus. However, when any movement of the armature 45a is made, as by the rubber being injected into the mold section starting to force them apart, then the operative conditions change in the Wheatstone bridge and the output from the Wheatstone bridge through leads 56a and 57a is sufficient that the detector 58a will immediately note the change in operating conditions and will provide an output signal through the lead 59a to an amplifier 60a provided in the circuit. Such signal then is transmitted to a switch 156, like the switch 56 of FIG. 2, for control action thereby as described before. The remainder of the control circuit of FIG. 3 would be the same as in FIG. 2.

FIG. 3 shows typical details of a further feature of the invention. A pressure tube 82 connects to the cylinder assembly 20 to receive and transmit the operating pressure therein. Such tube 82 connects to a control panel 30a and to a pressure actuated switch 83 provided in the controls. When full pressure is applied to the switch 83 to show a full mold closed condition, such switch is closed to complete a power supply circuit by leads 80 and 81 to a timer controlled switch 84. Such switch is adjustable as to the delay provided thereby so that for an injection time of, for example, 20 seconds, the switch 84 may have a delay of from 3 or 4 seconds up to 14 or 15 seconds. When the timer switch 84 closes, it completes energization of the signal generator 41 through the leads 80 and 81.

The switches or means 56 and 156 can connect to any suitable member such as a solenoid or relay actuated switch or means to terminate power supply to the injection means. After such means 56 and/or 156 have been actuated, the relay or switch 58 can open the power supply for the transducer 41, or open the power supply leads 51a until the press is opened. Then suitable limit switch means or equivalents can be actuated to close the power supply circuit.

As indicated, any elastomer material can be processed in the apparatus of the invention, but the press is particularly adapted for use with natural or synthetic rubbers.

In view of the above, the objects of the invention have been achieved, but while one complete embodiment of the invention has been disclosed herein, it will be appreciated that modifications of this particular embodiment of the invention may be resorted to without departing from the scope of the invention.

I claim:

1. In a control for an injection press including a frame having a fixed platen therein, a platen carried by said frame parallel to said fixed platen and movable towards and away from said fixed platen, hydraulic pressure and cylinder means to move said movable platen, a mold section operatively carried by each of said platens and being movable into pressure contact for molding action in a molding cavity formed thereby, an injection means secured to said frame and having a discharge means operatively connecting to said fixed platen and the mold section thereon for forcing material into the mold cavity, power means for actuating said injection means, the improvement comprising a transducer means operatively secured in relation to one of said platens and having a movable member associated therewith to change the signal produced, a contact means operatively secured to the other of said platens and positioned to contact the said movable member when said mold sections are engaged to vary said signal or voltage dependent upon the relative positions of said mold sections and to indicate a mold separating action, a variable second signal generating means, detector and control means for measuring and comparing said signals and providing an output change under predetermined conditions, relay means connected to said last-named means to be actuated when an output change from such means is received, circuit means connecting said relay means to said power means to terminate actuation thereof when said relay means is actuated, a power supply for said transducer and said second signal generating means, a pressure actuated switch connecting to said pressure and cylinder means to receive the hydraulic pressure therefrom and be actuated and closed when mold closing pressure exists, said switch being connected in said power supply, and a timer switch actuated by said pressure switch to be closed thereby after a predetermined interval, said power supply means being controlled by said timer switch.

2. In a control for an injection press including a frame having a fixed platen therein, a platen carried by said frame parallel to said fixed platen and movable towards and away from said fixed platen, a mold section being adapted to be operatively carried by each of said platens and being movable into pressure contact for molding action in a molding cavity formed thereby, hydraulic pressure cylinder means connecting to said platen to control the position thereof and mold closing action, an injection means secured to said frame and having a discharge means operatively connecting to said fixed platen and any mold section thereon for forcing material into the mold cavity, power means for actuating said injection means, the improvement comprising an electric signal means operatively secured to one of said platens and having a member associated therewith to change the signal produced, a contact means operatively secured to the other of said platens and positioned to contact said member of said signal means when said mold sections are in contact to vary said signal dependent upon the relative positions of said mold sections, a controllable variable second signal generating means, electric circuit means for measuring and comparing said signals and providing an output signal under predetermined conditions, actuable means connected to said last-named means to be actuated when an output from such last-named means is received, circuit means connecting to said actuable means and to said power means to terminate actuation of said power means when said actuable means is actuated, which action indicates completion of a molding injection cycle; a power supply for said electric signal means and said second signal generating means, a pressure actuated switch operatively connecting to said pressure cylinder means to receive the hydraulic pressure therefrom and be actuated and closed when mold closing pressure exists, said switch being connected in said power supply, and a timer switch actuated by said pressure switch to be closed thereby after a predetermined interval, said power supply means being controlled by said timer switch.

References Cited

UNITED STATES PATENTS

| | | | |
|---|---|---|---|
| 2,433,132 | 12/1947 | Lester | 18—30 CR X |
| 3,044,389 | 7/1962 | Rexford. | |
| 3,242,533 | 3/1966 | Wintriss | 18—16 C |

J. SPENCER OVERHOLSER, Primary Examiner

N. E. LEHRER, Assistant Examiner

U.S. Cl. X.R.

18—16 C